April 2, 1963 C. F. CROCKER ET AL 3,083,907

ELECTRONIC COUNTER

Filed Feb. 16, 1959 2 Sheets-Sheet 1

INVENTORS
CLARK F. CROCKER
HELMUT SCHWAB
RONALD E. JONES

BY

Christie, Parker & Hale
ATTORNEYS

INVENTORS
CLARK F. CROCKER
HELMUT SCHWAB
RONALD E. JONES
BY
Christie, Parker & Hale
ATTORNEYS

United States Patent Office 3,083,907

Patented Apr. 2, 1963

3,083,907

ELECTRONIC COUNTER

Clark F. Crocker, Concord, Mass., and Helmut Schwab, Altadena, and Ronald E. Jones, La Puente, Calif., assignors, by mesne assignments, to Consolidated Electrodynamics Corporation, Pasadena, Calif., a corporation of California Filed Feb. 16, 1959, Ser. No. 793,318

3 Claims. (Cl. 235—92)

This invention relates to electronic counters and more particularly to electronic ring counters adapted for selectively modifying the counting cycle of the counter.

Electronic counters are presently available utilizing counting elements controlled in a pre-selected fashion to render the switching elements responsive to pulses to be counted in accordance with various counting cycles. These counting elements may be switching elements switchable between two conductive conditions and which elements are arranged and controlled in accordance with a binary notation to render them responsive to pulses to be counted whereby the output indications of all the counting elements are indicative of a binary coded count recorded in the counter at any one time. These switching elements are also presently being used in ring circuits. A ring counting circuit is usually considered to be a device which has a defined number of stable states and achieves these states in a sequential fashion. The last of the sequential elements may be connected to the first element to define the ring or closed loop. Since the state in which a ring counter may be placed by means of a pulse to be counted often defines some control or operation of a system or device, it is very useful for such a ring circuit to be able to skip over certain counting elements thereby simplifying the control circuitry. Ring counting circuits are presently available which include a skipping feature; however, these skipping ring counters generally are complex and require quite a few components.

This invention provides an improved and simplified electronic counter of the ring type and which counter may be selectively controlled to modify or skip over some of the counting elements with a minimum of elements and associated circuitry. The counting elements utilized in embodying this invention comprise switching elements having two conductive conditions with each element arranged to receive the pulses to be counted substantially simultaneously. The counting elements are arranged with one element in a preselected counting conductive condition and are provided with a common circuit which assures that one and only one counting element is rendered switchably responsive to the pulses to be counted to place it in a counting state. A counting element is rendered responsive to a pulse to be counted only if the preceding counting element has been set in an operative or counting state to thereby cause the counter to sequentially step from counting element to counting element. This sequential operation can be modified to skip some of the counting elements through the provision of a simple control circuit responsive to the counting state of the element preceding a counting element to be skipped in a combination with a selectively applied skipping control signal to cause the pulses to be counted to skip over or be directed past at least one of the counting elements.

In the embodiment shown three sequential elements in a ring circuit consisting of seven elements are adapted to be selectively rendered non-responsive and thereby are skipped over in the counting sequence. The control circuit is arranged to provide the skipping action through the provision of circuit means including means responsive to a skipping control signal and the counting state signal of the counting element preceding an element to be skipped, in this instance, the third counting element. The control circuit means is arranged to provide a signal to the first counting element to be skipped, the fourth counting element, which is effective to maintain not only this element but also the elements following the fourth element in the sequence in a non-counting or "off" conductive condition. The signal provided by the counting element preceding the counting element to be skipped is further utilized in combination with the skipping control signal and the signal indicative of the counting state of the last counting element skipped, the sixth counting element, to render the seventh and succeeding element responsive to pulses to be counted. Therefore, the pulse to be normally recorded in the fourth element will be directed by means of this control circuit to be recorded in the seventh counting element rather than the fourth element. The fifth pulse to be counted will accordingly be recorded in the first element of this ring circuit.

These and other features of the present invention may be more fully appreciated when considered in the light of the following specification and drawings, in which.

Figure 1:
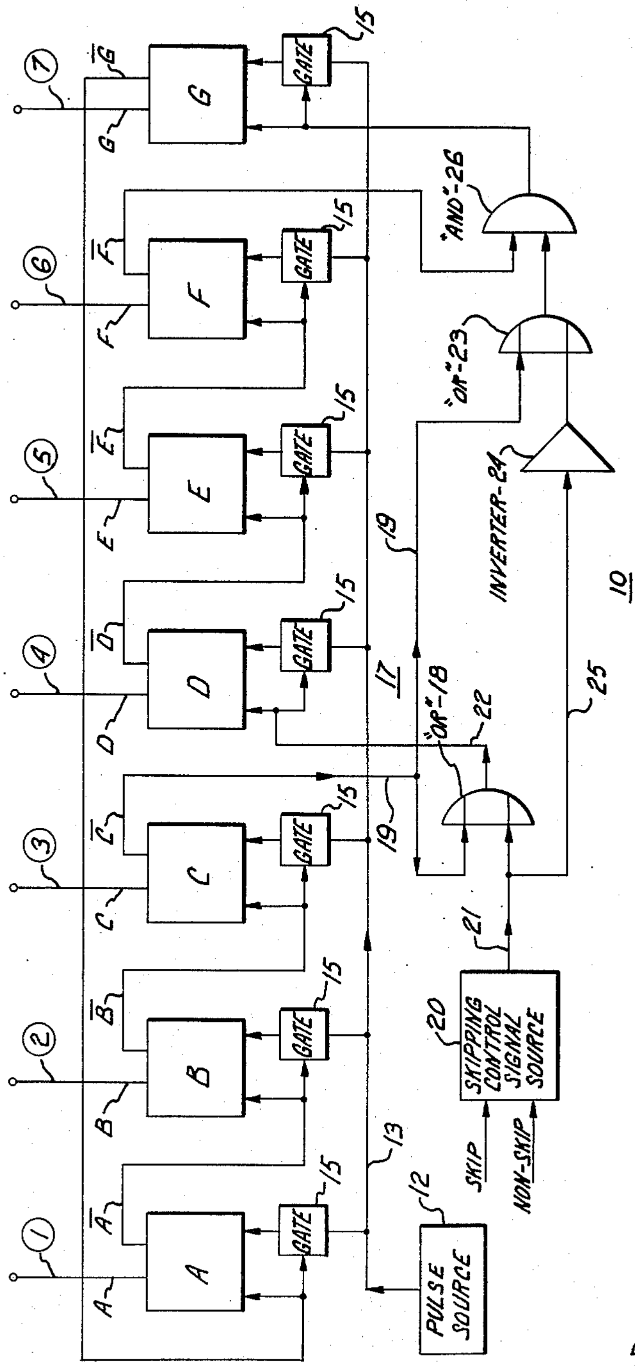
FIG. 1 is a block diagram of an electronic counter embodying the invention.

Now referring to FIG. 1, the electronic counter 10 of this invention will be described. The counter 10 comprises a plurality of similarly arranged counting elements, shown as the seven elements identified by the reference letters A–G arranged as a ring counting circuit. Each counting element A–G may be characterized as a switching element switchable between two conductive conditions or having bistable properties such as provided by the well-known Eccles-Jordan type bistable circuit. The two conductive conditions of such circuits will be noted as relatively high and low level signals. The circuits are described as being responsive to low level signals. The two output circuits representative of these two conductive conditions for the switching elements A–G are identified in the drawings by their individual reference letter while the complementary conductive condition is denoted by a horizontal bar placed over the reference letter. The two conductive conditions for the counting element A, for example, are shown in the drawings as A and $\overline{A}$, wherein the A output represents the operative counting state of the element when this output is at a relatively low level. Correspondingly, the $\overline{A}$ output will have a high level at this same time. Also, a non-counting state of element A occurs when the A output is at a high level and the $\overline{A}$ is at a low level. Each of the remaining counting elements of the counter 10 are arranged to be in counting and non-counting state in the same fashion. The element or circuit (not shown) controlled by the counter 10 will be connected to be responsive to the conductive condition of the unbarred output circuits for the counting elements A–G and which circuits are shown as respectively representing the counts 1 through 7. The barred outputs for these counting elements are in turn connected to control the conductive condition of the successive counting elements in a fashion to control the response thereof to the pulses to be counted, as will be described hereinafter.

Each of the counting elements A–G are shown with a pair of input circuits connected to a source of pulses to be counted shown in block form as a pulse source 12. The pulse source 12 is connected by means of a lead wire 13 in combination with a gating circuit 15 to one of two input circuits for each of the counting elements A–G, so that a pulse provided by the source 12 will be applied substantially simultaneously to each of these counting elements. The gating circuits 15 are each arranged to provide an output signal in response to the pulses to be counted in combination with a preselected conductive condition of the preceding counting element, in this instance when the previous counting element is in a non-counting state. To this end each of the barred output circuit is connected to the gating circuit 15 for the succeeding element; $\overline{A}$ output to gating circuit 15 for the element B, $\overline{B}$ output to circuit 15 for element C, etc. These gating circuits 15 are each arranged to provide an output signal for the associated counting element when the barred output is at a low conductive condition to thereby pulse the associated element "off." The application of a pulse to be counted is inhibited by the gate 15 when the preceding element is in a relatively high state of current conduction.

The complementary or barred output circuit is also coupled directly to the other input circuit for the succeeding counting element and which signal coupled thereto in combination with a pulse to be counted will cause the succeeding element to be maintained in a non-counting state as long as the signal is representative of a non-counting state. This signal will be effective to switch the succeeding counting element only when the previous counting element has been switched from a counting to a non-counting state to thereby provide the switching signal for the succeeding counting element. It should be noted at this point that this switching action will occur without the use of the gating circuits 15 and which circuits are utilized to merely render the counting elements of the counter 10 more reliable by assuring response to only one command at any one time. Accordingly, when counting element A is in a counting state the $\overline{A}$ output will be in a relatively high level so that a pulse appearing at gate 15 for element B will not be passed to the counting element B to switch its current state and substantially simultaneously therewith counting element A will have its current conduction state reversed in response to the pulse to be counted. Following the change of state of counting element A, the signal provided thereby on the $\overline{A}$ output and delivered to element B will cause this latter element to be switched to the counting state. In this same fashion the operative counting state of each of the counting elements may be sequentially stepped from counting element A to B to C to D, etc., to counting element G and then back to counting element A. This is conventional ring counting.

A control circuit 17 is shown in FIG. 1 for selectively causing the counter 10 to skip from element C to element G. This control circuit 17 includes a two input OR circuit 18 having one of the inputs connected by means of the lead wire 19 to be responsive to the conductive condition of the $\overline{C}$ output. Also, it should be noted that the $\overline{C}$ output is not coupled to the counting element D. The remaining input circuit for the OR circuit 18 is connected to a skipping control signal source 20 by means of lead wire 21. The skipping control signal source 20 may comprise a switching element having bistable characteristics of the type utilized for the counting elements A–G to alternately and selectively provide signals of two levels, relatively high and low levels. The OR circuit 18 is connected to the control signal source 20 to be responsive thereto to provide an output signal on wire 22 when this source 20 provides a signal of relatively low level or the $\overline{C}$ input circuit is at a low level. The control signal source 20 is selectively controlled to place it in a skip or non-skip mode, the latter causing the signal on wire 21 to be in a high level. The lead wire 22 is coupled directly to an input circuit for counting element D. The output signal on wire 22 from OR circuit 18 during a skipping counting mode will be effective to pulse counting element D in a non-counting state or "off," as long as the OR gate 18 provides this desired signal. It will be appreciated that since counting element D will not be rendered responsive to the pulses to be counted, likewise the remaining elements following counting element D in this sequence, namely the elements E, F, and G, will be maintained in a non-counting state.

The conductive condition of counting element C as represented on the $\overline{C}$ output is also applied by means of wire 19 to another OR circuit 23. The OR circuit 23 is also a two-input circuit having its remaining input circuit connected to be responsive to the output signal provided by an inverter circuit 24. The inverter circuit 24 is in turn coupled by means of a lead wire 25 to the output wire 21 for responding to the state of the control source 20. The OR circuit 23 is of the same type as the OR circuit 18 so that it will provide an output signal of a relatively low level when either of the two input circuits are provided with a signal of a relatively low level. Therefore the output signal from OR circuit 18 is of a low level when $\overline{C}$ is low or control source 20 is in a skipping mode. It will be recognized that since the control circuit 17 is only operative for the skipping mode, the OR circuit 23 is always provided with a relatively high level signal from inverter 24, so that its output signal is always representative of the counting state of counting element C. The output circuit for the OR circuit 23 is coupled to a two-input AND circuit 26. The remaining input for the AND circuit 26 is connected to be responsive to the conductive condition of the $\overline{F}$ output, while the output circuit for AND circuit 26 is connected to the two input circuits for the counting element G to render it responsive to a pulse to be counted in the normal fashion; that is, it is applied to both input circuits including the gating circuit 15 for the element G.

The interconnection of elements D, E and F is as described hereinabove. The AND, OR and inverter circuits utilized for the control circuit 17 are conventional circuits and may be of the type described in the I.R.E. Transactions—Electronic Computers, for September 1954 in an article by E. C. Nelson entitled "An Algebraic Theory for Use in Digital Computer Design," wherein pages 17–20 describe such AND, OR and inverter circuits.

With this structure in mind, the operation of the electronic counter 10 including the skipping function thereof will now be described. It will be appreciated that the first two pulses provided by the pulse source 12 that are applied to the counter 10 will sequentially step the counter 10 from counting element A to counting element B and then to counting element C. At this time counting element C will have its C output at a relatively low level with its complementary output, $\overline{C}$, at a relatively high level. Assuming the skipping mode is desired for the counter 10, the control signal source 20 will provide a signal on wire 21 of a relatively low level so that the output for the OR circuit 18 will be at a relatively low level, despite $\overline{C}$ being in a high level. The output signal from the OR circuit 18 delivered to counting element D will then continually pulse the element D to a non-counting state. The output signal from the OR circuit 23 at this time will be of a relatively high level since at this time both of its input circuits are at a relatively high level, the one input circuit being representative of the high level of the $\overline{C}$ output while the inverter 24 has changed the low level signal from the control signal source 20 to a high level signal. This high level is applied to the AND circuit 26 in combination with the low level of the $\overline{F}$ output representative of the non-counting state of counting element F. It will be recognized that both counting elements E and F are in a non-counting state since they are both dependent on counting element D reaching a counting state in order that they may switch. Accordingly, the output signal provided by the AND circuit 26 is of a relatively high level and will inhibit the third pulse to be counted arriving at gating circuit 15 for counting element G. The third pulse to be counted upon arriving at counting element C will be effective to switch it from its counting state to provide a signal at the $\overline{C}$ output of a relatively low level. This signal rather than switching the element D, as in the non-skipping mode, will be effective through control circuit 17 to cause counting element G to be switched. The signal is effective through OR circuit 23 to cause the output signal from AND circuit 26 to go to a low level for switching counting element G. It will now be seen that the counter 10 will follow a counting sequence of A—B—C—G or 1—2—3—7, and then back to counting element A, skipping counting elements D, E and F. This sequence will continue until counter 10 is returned to its normal sequential operation by programming the control signal source 20 to a non-skip mode whereby the control circuit 17 will be rendered inoperative.

Figure 2:
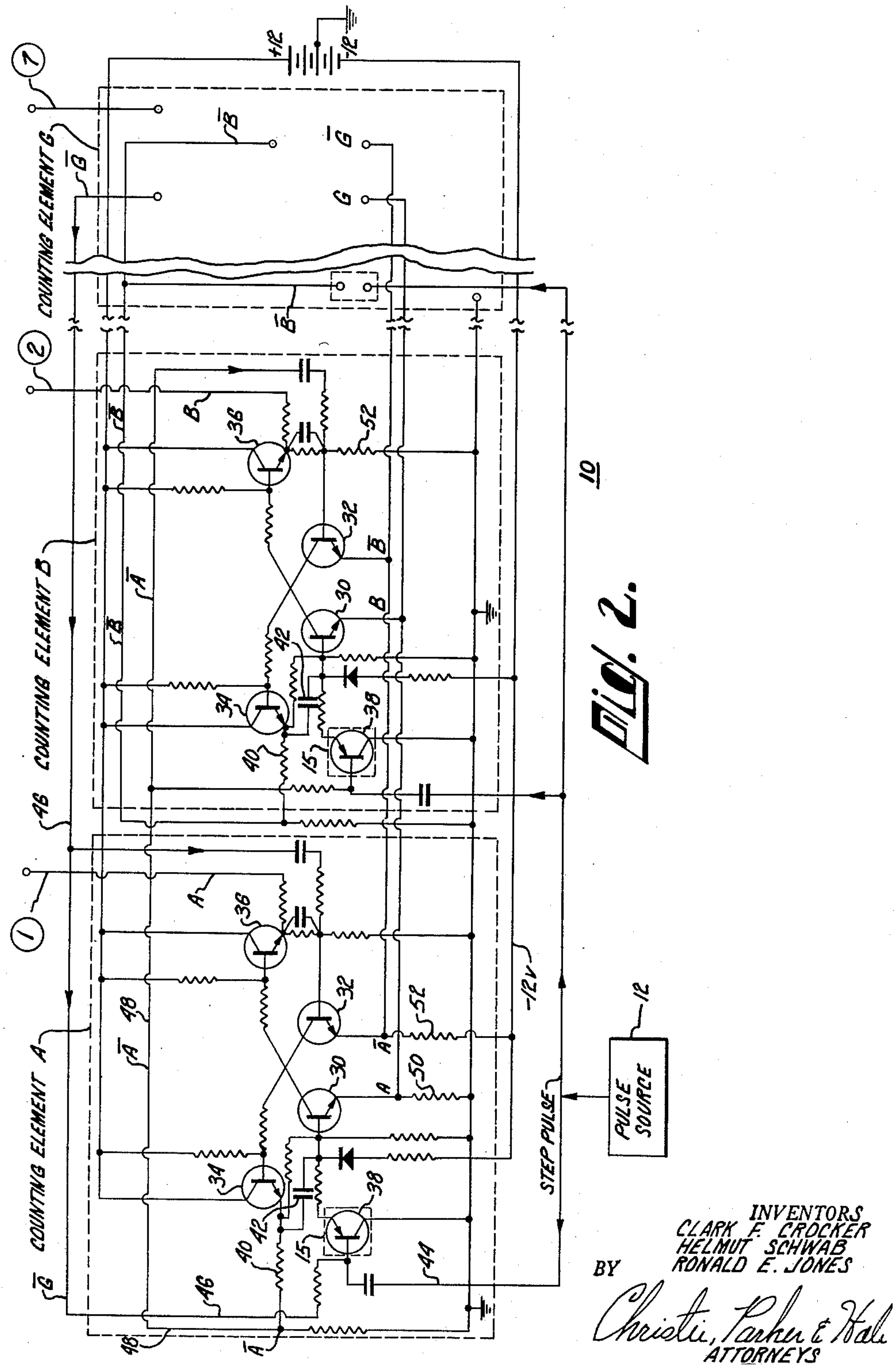
FIG. 2 is a schematic circuit diagram, partially in block form, of the counting elements for the counter of FIG. 1.

Now referring to FIG. 2, the detail circuitry for cascading typical switching elements for use in the electronic counter 10 will be described. The switching element is shown in the form of a transistorized conventional Eccles-Jordan flip-flop circuit. The counting elements A and B for the counter 10 are shown in detail. Each of the counting elements A and B comprises a pair of cross-coupled transistors 30 and 32 provided with a corresponding pair of emitter followers 34 and 36. The circuit elements for the transistors 30 and 32 are arranged so that when element A is in a non-counting state the transistor 30 is in a non-conducting condition while the transistor 32 is in a conducting condition at this time. Accordingly, the $\overline{A}$ output derived from the emitter circuit of the emitter follower 34 is representative of this conductive condition and will be at a relatively low level while the complementary or A output derived from the emitter circuit of the emitter follower 36 will be at a relatively high level.

The transistor 30 includes the gating circuit 15 connected in series with its base element and which gating circuit 15 comprises a gating transistor 38. The gating circuit 15 is also responsive to the conductive condition of the transistor 32 for the previous counting element, in this instance element G. The signal indicative of the counting condition of element G is applied to counting element A by means of the lead wire 46 connected to the base of gating transistor 38. A similar connection is made for each of the counting elements A–G; for example, the lead wire 48 connected to the $\overline{A}$ output is connected to counting element B to be applied to gating transistor 38 for element B as well as to the transistor 32 thereof. The $\overline{A}$ output is provided with a differentiating network including the resistor 40 and capacitor 42 connected to the emitter of the transistor 38, as shown. The pulses from the pulse source 12 are also coupled into the gating circuit 15 through the base of the gating transistors 38 by means of a lead wire 44. The gating circuit 15 will be operative to allow the pulse to be counted to be applied to the transistor 30 to turn it off in the fashion described hereinabove. The remaining circuit means for the counting elements A–G comprises a common circuit which assures that one and only one counting element can be in a counting state at any one time. This common circuit comprises a common resistor 50 connected in series circuit relationship between a common circuit terminal, such as the ground wire shown and the emitters of each of the transistors 30 for the counting elements A–G. This common circuit also includes a resistor 52 for each of the emitters of the transistors 32 and which resistors 52 are connected to the negative terminal of the supply source, shown as a 12 volt battery.

Although the electronic counter 10 has been described in conjunction with a skipping mode wherein the counter sequences through counting elements 1, 2, 3, and 7, it will be recognized that many more configurations or skipping modes are possible by adding suitable control levels or signals. The seven counting elements shown have many possibilities, including the following:

1—2—3
1—4—6
1—2—4—6
1—2—3—4—6
1—4—5—6
1—2—4—5—6
1—2—3—4—5—6

Also, it will be understood that any number of counting elements may be employed in the ring in accordance with the concept of this invention and that the ring circuit may be reset to any counting position. The ring circuit is further arranged to be locked in any counting position by means of a control signal. It will also be recognized by those skilled in the art that although the logical control circuit 17 employs low level signals, high level logical control may also be utilized within the concept of this invention.

What is claimed is:

1. An electronic counter comprising a plurality of switching elements, each of the switching elements having a first and a second conductive state and being switchable between the conductive states in response to pulses to be counted, one of the switching elements being set to its first conductive state to indicate the count received by the counter, circuit means connecting the switching elements in a ring circuit to render only the switching element coupled to the switching element in the first conductive state switchably responsive to a pulse signal to be counted to thereby switch only the succeeding switching element in the ring circuit to its first conductive state whereby the switching elements are rendered sequentially and cyclically responsive to the pulses to be counted, a source of pulses to be counted, circuit means for substantially simultaneously applying the pulses to be counted to each switching element, a control signal source for selectively developing control pulses, and control circuit means interconnected between a first preselected switching element and a second preselected switching element, at least one switching element existing between the preselected switching elements in the ring circuit, the control circuit including a first OR circuit connected to be responsive to the control pulses and the first preselected switching element in its first conductive state for maintaining the switching element following the first preselected switching element in its second conductive state, an inverter circuit connected to be responsive to the control pulses, a second OR circuit connected to be responsive to the first preselected switching element in its first conductive state and the output of the inverter circuit, and an AND circuit connected to be responsive to the output signal of the second OR circuit and the switching element preceding the second preselected switching element in the ring circuit when in its second conductive state to render the second preselected switching element switchable in response to a subsequent pulse to be counted after the first preselected switching element switches to its first conductive state in response to a pulse to be counted.

2. The apparatus defined in claim 1 wherein the circuit means for simultaneously applying the pulses to be counted to each of the switching elements includes a gating circuit coupled to each switching element and each receiving the pulses to be counted together with a signal developed by the preceding switching element in the ring circuit for providing an output signal to its associated switching element to pulse the associated switching element to its second conductive state when the preceding switching element is in the second conductive state.

3. The apparatus defined in claim 1 wherein the switching elements each include a transistor circuit having two stable states for defining the first and second conductive states of the switching elements.

References Cited in the file of this patent

UNITED STATES PATENTS

| | | |
|---|---|---|
| 2,697,549 | Hobbs | Dec. 21, 1954 |
| 2,792,991 | Di Cambio | May 21, 1957 |
| 2,810,099 | Townsend et al. | Oct. 15, 1957 |
| 2,816,156 | Pawley et al. | Dec. 10, 1957 |
| 2,828,071 | Burton | Mar. 25, 1958 |
| 2,872,110 | Snyder et al. | Feb. 3, 1959 |
| 2,887,590 | Warman | May 19, 1959 |
| 2,910,236 | Harper | Oct. 27, 1959 |